United States Patent [19]

Tuan et al.

[11] Patent Number: 5,054,511
[45] Date of Patent: Oct. 8, 1991

[54] TIRE VALVE HAVING AN AUTOMATIC PRESSURE RELEASE DEVICE

[76] Inventors: C. T. Tuan; T. L. Duan, both of 4F, 64, Lane 283, Chung Cheng Rd., Yung Ho, Taipei Hsien, Taiwan

[21] Appl. No.: 580,285
[22] Filed: Sep. 11, 1990
[51] Int. Cl.⁵ .................. F16K 15/20; B60C 29/00
[52] U.S. Cl. .................................. 137/224; 137/493.8
[58] Field of Search .................. 137/224, 493.8; 152/415, 427, 429

[56] References Cited

U.S. PATENT DOCUMENTS

| | | | |
|---|---|---|---|
| 1,006,159 | 10/1911 | Wetherholt | 137/224 |
| 1,144,499 | 6/1915 | Owens et al. | 137/224 |
| 1,175,208 | 3/1916 | Vosler | 137/224 |
| 1,243,521 | 10/1917 | Henemier | 137/224 |
| 1,588,046 | 6/1926 | Nelson | 137/224 |
| 1,934,571 | 11/1933 | Sutton | 137/224 |
| 2,226,022 | 12/1940 | Shutts | 137/493.8 X |
| 2,570,937 | 10/1951 | Gash | 137/493.8 X |
| 3,009,474 | 11/1961 | Crichton | 137/493.8 X |
| 3,807,432 | 4/1974 | Cain | 137/224 |
| 3,910,305 | 10/1975 | Hughes | 137/224 |
| 4,015,623 | 4/1977 | Wanstreet | 137/224 |
| 4,064,897 | 12/1977 | Weber | 137/224 |

FOREIGN PATENT DOCUMENTS

| | | | |
|---|---|---|---|
| 7012 | of 1910 | United Kingdom | 137/224 |
| 207055 | 12/1922 | United Kingdom | 137/224 |

Primary Examiner—John Rivell
Attorney, Agent, or Firm—Wenderoth, Lind & Ponack

[57] ABSTRACT

A tire valve is disclosed which includes an automatic pressure releasing device and comprises an inlet assembly and an outlet assembly. The inlet assembly includes a valve pole biased closed by a spring to allow air input. The valve includes an inlet/outlet assembly which has an inlet valve room and a pressure release room. These rooms utilize ball valves and springs to control the air flow. A pressure releasing device is provided and comprises an adjusting screw, a spring and a ball valve. The pressure releasing device will function when the tire air pressure exceeds a specified range, so as to ensure proper air pressure in the tire.

20 Claims, 4 Drawing Sheets

TIRE VALVE HAVING AN AUTOMATIC PRESSURE RELEASE DEVICE

BACKGROUND OF THE INVENTION

1. Field of the Invention

The present invention is related to a tire valve which can reduce inner pressure and maintain the pressure value within a specified range so as to prevent over-inflation and ensure driving security, and also to prolong the life of the tire.

2 Description of the Prior Art

It is understood that air pressure inside a tire can allow a vehicle to maintain elasticity during driving and absorb stress caused by acceleration, braking and turning. It is also correct that the characteristics, including the air pressure, of the tire will vary drastically depending on the design or materials used. Air pressure which is too high or too low will deteriorate the quality of the tire and may cause generation of high temperatures and extraordinary deterioration, which will affect the safety of the vehicle.

Driving within the specified tire pressure range can guarantee very smooth driving, low attrition temperature, reduced road resistance, fuel economy and longer tire life. However, as is well known, when a vehicle with tires inflated to a pressure within the specified range, is driven fast or in warm weather, the tire pressure will increase. When this occurs, it is often necessary for the driver to stop the car and manually release the tire pressure to prevent deterioration to the tire or to the vehicle. If this is not done, the tire may explode and the life of the driver may be jeopardized. This is a serious known fact which is in desperate need of resolution.

SUMMARY OF THE INVENTION

The main object of the invention is to provide a tire valve which has the capability of regulating air pressure in a tire to maintain the most suitable driving conditions and avoid the possibility of tire explosion and thereby secure the safety of the vehicle and the lives of passengers.

Another object of the present invention is to detect the value of the inner pressure when it exceeds the specified pressure range and to then cause the device to start functioning. It is also an object to stop the functioning of the device when the pressure is reduced to within the required range. The air pressure in a tire can be maintained at the level of standard air pressure value by use of the inventive device.

DETAILED DESCRIPTION OF THE PREFERRED EMBODIMENTS

Figure 1:
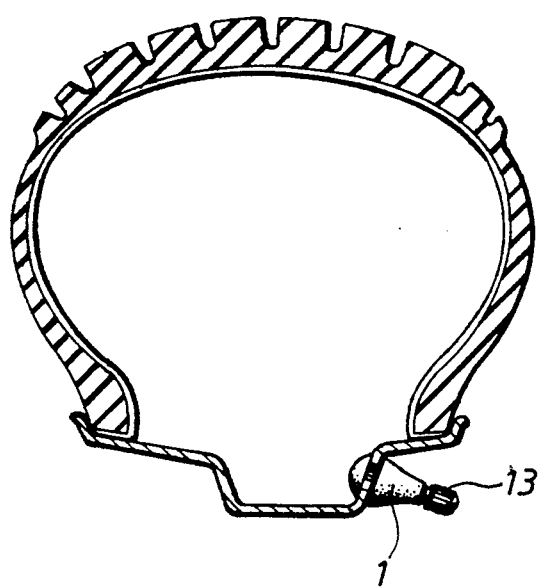
FIG. 1 is a sectional view of a tire and a tire valve according to the present invention.

A tire valve according to the present invention includes an automatic pressure releasing device composed of one valve body (1), one air inlet assembly and one air outlet assembly.

Valve body (1) includes a hollow chamber (11) with an inside diameter which is larger at the top end and smaller at the bottom end. Both the top and bottom portions of the chamber (11) have helical threads therewithin to allow for the tightening of an inlet assembly (2) and a outlet assembly (3). An exhaust hole (12) is provided through a lower portion of the valve body 1, and a top cover (13) is provided to seal the top entrance.

The air inlet assembly (2) has external helical threads thereabout to engage with the upper internal threads of the valve body (1) hollow chamber (11). The air inlet assembly (2) has a through hole (21) through the center thereof to accommodate a valve pole (23). Additionally, a frustoconically shaped portion (22) is formed at the bottom of the inlet assembly (2).

Valve pole (23) has a smaller diameter than the center hole and extends through the center hole (21), its length being longer than the air inlet assembly (2). A sealing ring (231) is provided at the bottom end of the valve pole (23) to seal the air flow through the center hole (21) at the bottom of air inlet body (2). At the top of the valve pole (23) is a ring channel (232) for receiving and engaging an E-ring (233) so as to confine the top end of spring (24) (see FIG. 3).

When assembled, spring (24) is mounted about the top part of valve pole (23). One end of spring (24) acts against the top of the inlet assembly (2) and the other end is fixed acts against the E-ring (233).

Figure 2:
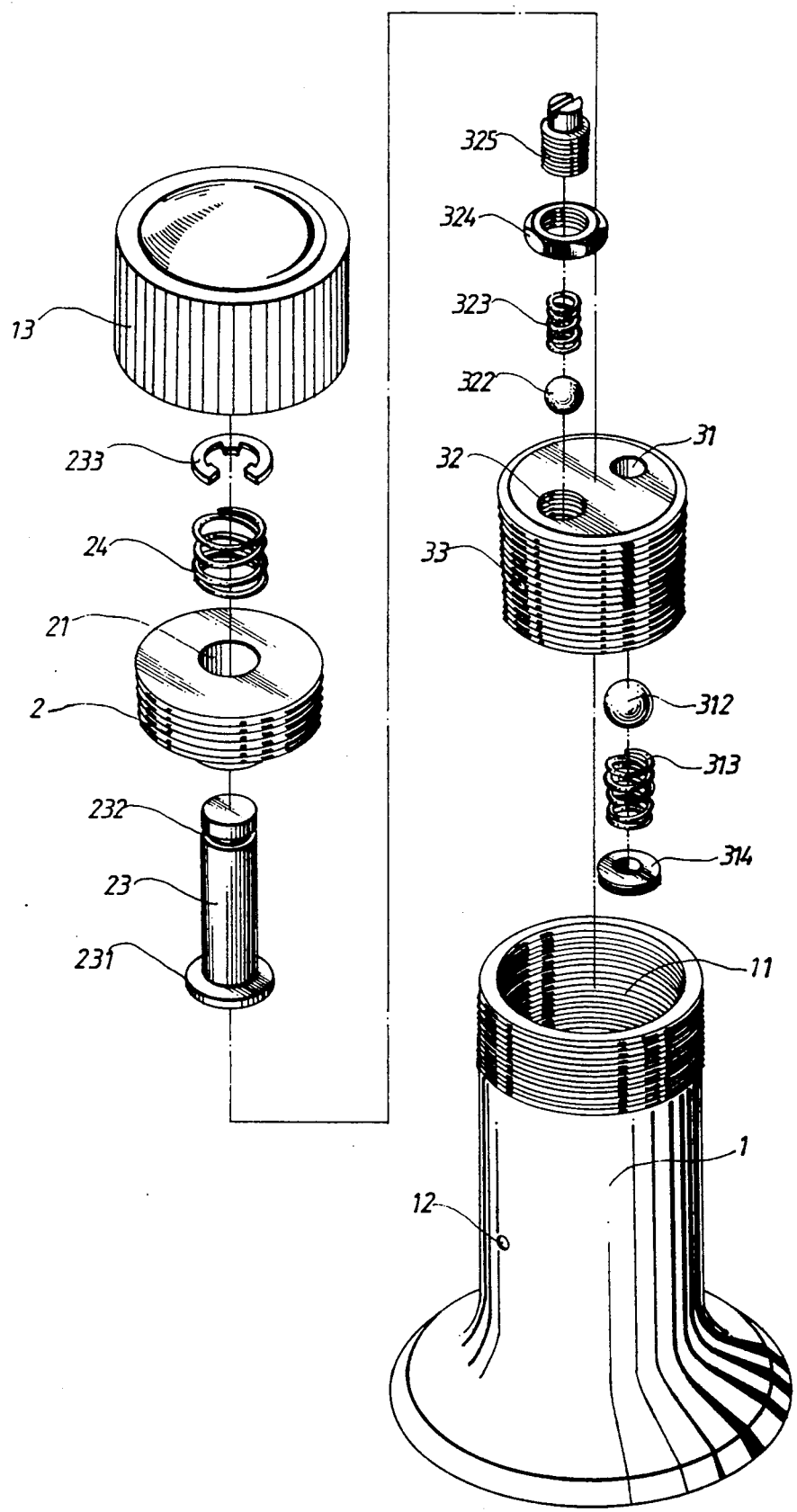
FIG. 2 is a perspective exploded view of a tire valve according to the present invention.

As indicated in FIG. 2, the procedure for assembling the inlet assembly (2) includes extending valve pole (23) though the center hole (21) of the inlet assembly (2) from the bottom and then placing spring (24) on the top part of the valve pole (23) above the inlet assembly (2). The E-ring (233) is then engaged in the ring channel (232). Under normal conditions, because of the expansion of the spring (24) and the air pressure within the center hole, the sealing ring (231) of the valve pole (23) will block the bottom of the center hole (21) to stop air from leaking therethrough. In order to pump through the valve (i.e. into the tire) the valve pole (23) is pressed downwardly against the bias of spring (24) so as to lower the sealing ring (231) and open the bottom end of the center hole (21) and form an air inlet channel.

Figure 3:
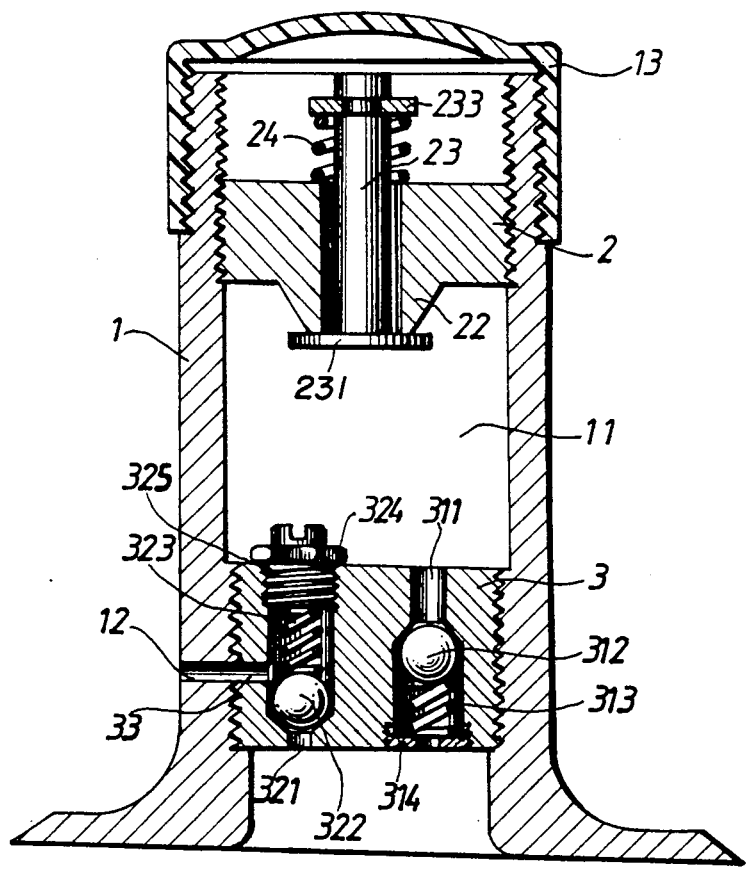
FIG. 3 is a sectional view of a tire valve according to the present invention.

As shown in FIGS. 2 and 3, the inlet and outlet assemblies are composed of the following components:

The inlet/outlet assembly (3) includes external helical threads thereabout to engage with the internal helical threads at the lower portion of the hollow chamber (11) of valve body (1). A valve room (31) and a releasing room (32) are formed through the inlet/outlet assembly (3). A bypass hole (33) is formed at the side of the releasing room (32) and connects with the exhaust hole (12) in valve body (1), so as to release unnecessary pressure.

As shown in FIG. 3, the valve room (31) includes an inlet hole (311) at an upper end thereof, and internal helical threads at a lower end thereof to fix the ball valve (312) and spring (313). An externally threaded fixing ring (314) having an inner hole therethrough is engaged with the internal threads of the valve room (31) to seal the bottom of valve room (31). The ball valve (312) and spring (313) are supported by the fixing ring (314) to seal the bottom end of the inlet hole (311).

The releasing room (32) includes an outlet hole (321) at a lower end thereof, and internal threads at an upper end thereof. A ball valve (322) and spring (323) are provided in releasing room (32). An adjusting screw (325) with adjustment head (324) is provided to seal the upper end of the releasing room (32), and to adjustably mount the spring (323) and ball valve (322) in the releasing room (32).

As indicated in FIG. 3, the procedure for assembling the inlet/outlet assembly (3) is to insert the ball valve (312) and the spring (313) into valve room (31) and then seal the valve room (31) with the fixing ring (314). Then the ball valve (322) and the spring (323) are inserted into releasing room (32) which is sealed with the adjusting screw (325). The adjusting screw (325) can be adjusted to a specified position to maintain the spring (323) at a proper biasing force against the ball valve (322). In other words, the adjusting screw (325) allows the desired pressure to be adjusted.

The tire valve which has an automatic pressure releasing device according to the invention has various components as explained above. The installation and the methodology is to assemble the inlet/outlet assembly (3) into the lower portion of the hollow chamber (11) of valve body (1), and align the bypass hole (33) with the exhaust hole (12) and then screw the inlet assembly (2) into the upper portion of the hollow chamber (11) of valve body (1). While pumping air into a tire, the valve pole (23) along with the sealing ring (231) will be pressed downwardly to allow air to flow through the center hole (21) into the air room (11). When the pressure in the air room (11) is higher than the pressure in the valve room (31) the ball valve (312) will be driven down and the inlet hole (311) will be opened to allow the air to flow into the tire through the hole in the fixing ring (312). When the pumping of air is terminated, the pressure to valve pole (23) disappears, the spring (24) will push the valve pole (23) into its normal resting position where the fixing ring (231) will seal the bottom end of the center hole through inlet assembly (2). Additionally, with no air pressure impinging against the ball valve (312) from above, spring (313) presses ball valve (312) upwardly to seal the inlet hole (311), such that no air can leak therethrough.

When the tire pressure is increased due to high speed driving or high temperature and it exceeds the specified range (i.e. when tire pressure is greater than the pressure from spring (323) upon ball valve (322)) the ball valve (322) will move up above the bypass hole (33) and allow air to flow out through bypass hole (33) and the exhaust hole (12) until the specified pressure range is attained. This device can ensure that the pressure of the tire will not exceed a predetermined pressure.

Figure 4:
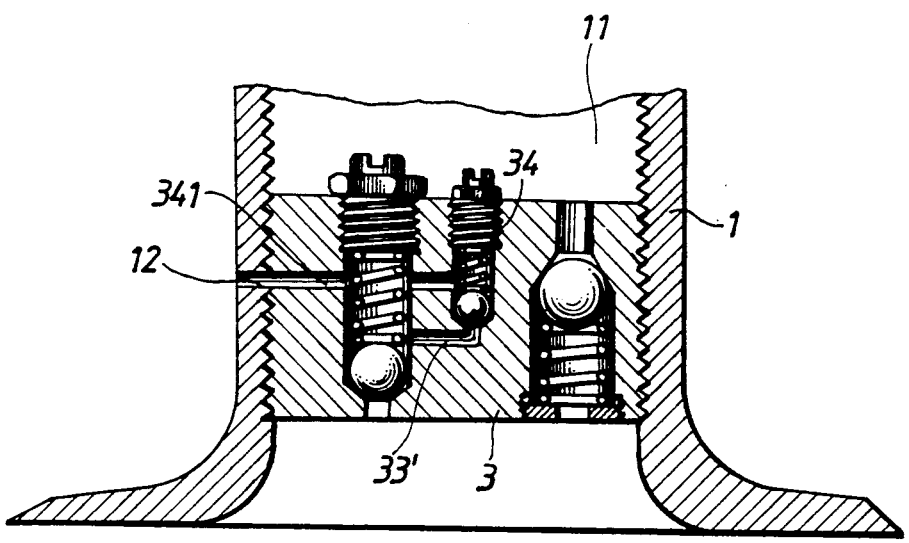
FIG. 4 illustrates a sectional view of another embodiment of the present invention, showing the tire valve inlet and outlet assembly.

FIG. 4 shows an alternative embodiment of the invention. In this embodiment, an auxiliary releasing room (34) is provided and includes a structure which is identical to that of releasing room (32) but on a smaller scale. An auxiliary outlet hole (33') is communicated with the bottom of the auxiliary releasing room (34) and an auxiliary bypass hole (341) is provided to communicate between the main releasing room (32), the auxiliary releasing room (34), and the exhaust hole (12) of valve body (1). The purpose of the auxiliary releasing room (34) is to provide a safeguard in case one leakage control device fails.

Figure 5:
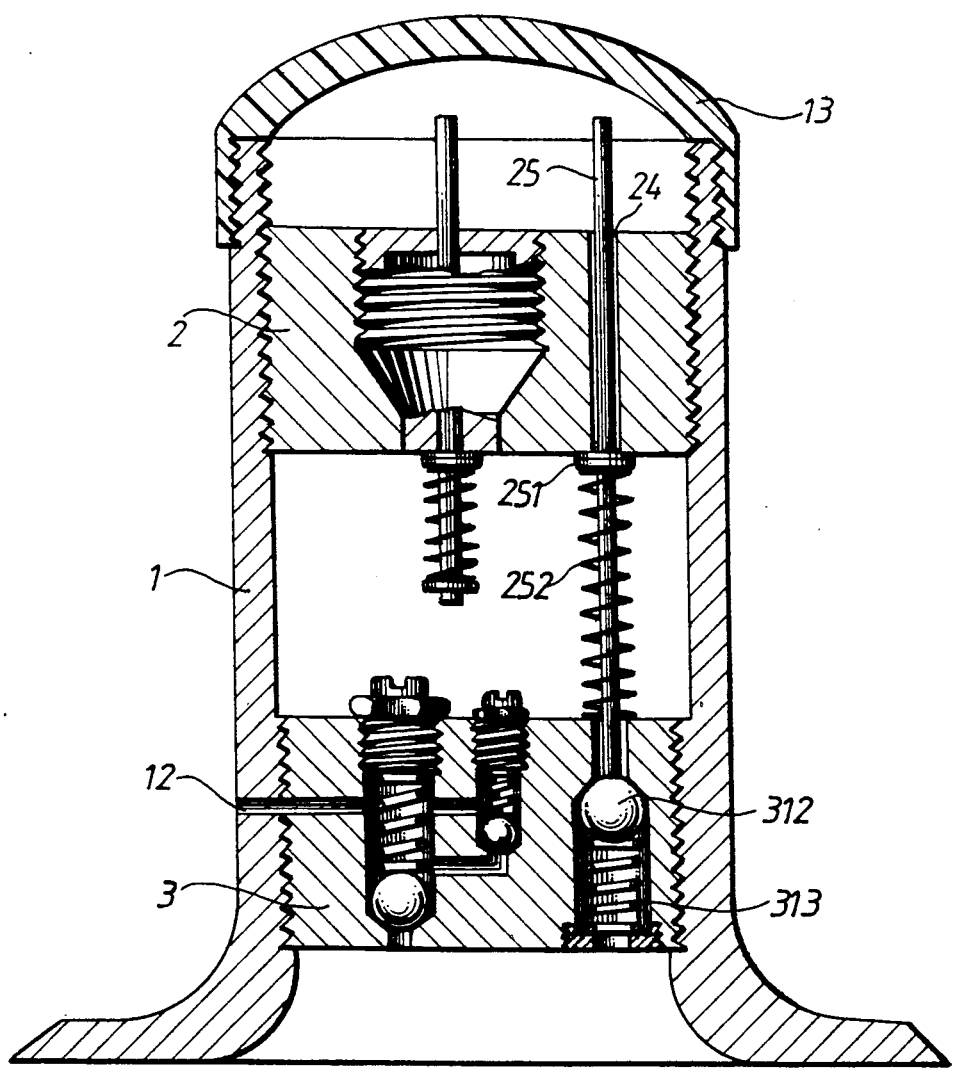
FIG. 5 illustrates a sectional view of a further embodiment of the tire valve according to the present invention.

Another alternative embodiment of the invention is shown in FIG. 5. In this embodiment, a manual pressure release hole (24) and actuating rod (25) are provided. A sealing ring (251) is fixed to the rod (25) at a middle portion thereof and a spring (252) is disposed about the rod (25) at the lower portion thereof. The bottom end of the rod (25) is connected to the ball valve (312). With the spring (252) interposed between the inlet/outlet assembly and the sealing ring (251), the sealing ring (251) is biased upwardly to seal the pressure release hole (24). If necessary, actuating rod (25) can be pushed down manually to lower the ball valve (312) to release air from inside the tire and to lower the sealing ring (251) to release the air pressure. Therefore, this invention provides for both automatic pressure adjustment and manual pressure adjustment.

From the above description, it is clear that this invention can be useful in many situations, since it not only allows air to be filled into the tire, but also provides for automatic regulation of the tire air pressure, so as to provide reliability and safety.

I claim:

1. A valve for use with a tire, comprising:
   a valve body having a chamber formed therein opening through top and bottom ends of said valve body, and an exhaust hole formed through said valve body at a lower portion thereof;
   an inlet assembly mounted in an upper portion of said chamber and including
   an inlet assembly body having a central hole formed therethrough,
   a valve pole slidably extending through said central hole and having a sealing ring, larger in diameter than said valve pole, mounted to a bottom end thereof, and
   first biasing means for biasing said valve pole upwardly such that said sealing ring is biased into engagement against a bottom surface of said inlet assembly body to seal said central hole; and
   an inlet/outlet assembly mounted in a lower portion of said chamber and including
   an inlet/outlet assembly body having formed therein an intake room in communication with portions of said chamber above and below said inlet/outlet assembly body, a releasing room in communication with a portion of said chamber below said inlet/outlet assembly body, and a bypass hole extending between said releasing room and said exhaust hole to communicate said releasing room to an outside of said valve body,
   a one-way intake valve means for allowing air to flow from the portion of said chamber above said inlet/outlet assembly body through said intake room to the portion of said chamber below said inlet/outlet assembly body only when air pressure in the portion of said chamber above said inlet/outlet assembly body is greater than a first predetermined pressure, and
   a one-way releasing valve means for allowing air to flow from the portion of said chamber below said inlet/outlet assembly body through said releasing room, said bypass hole and said exhaust hole to the outside of said valve body only when air pressure in the portion of said chamber below said inlet/outlet assembly body is greater than a second predetermined pressure.

2. A valve as recited in claim 1, wherein internal helical threads are formed in upper and lower portions of said valve body;

said inlet assembly body has external helical threads formed thereabout for engagement with said internal helical threads formed in the upper portion of said valve body; and said inlet/outlet assembly body has external helical threads formed thereabout for engagement with said internal helical threads formed in the lower portion of said valve body.

3. A valve as recited in claim 2, wherein
the upper portion of said valve body has a larger inside diameter than the lower portion of said valve body.

4. A valve as recited in claim 2, wherein
said inlet assembly body has a frustoconicaly shaped portion formed at a bottom side thereof.

5. A valve as recited in claim 1, wherein
said biasing means comprises a retaining ring mounted adjacent an upper end of said valve pole and a spring interposed between said retaining ring and a top surface of said inlet assembly body.

6. A valve as recited in claim 1, wherein
said inlet/outlet assembly body further has an inlet hole formed between said intake room and the portion of said chamber above said inlet/outlet assembly body; and said one-way intake valve means comprises a fixing ring having a hole formed therethrough mounted in a bottom portion of said intake room, a first ball valve mounted in said intake room, and a spring interposed between said fixing ring and said first ball valve for biasing said first ball valve upwardly to seal off communication between said intake room and said inlet hole.

7. A valve as recited in claim 6, wherein
said inlet/outlet assembly body further has an outlet hole formed between said releasing room and the portion of said chamber below said inlet/outlet assembly body; and said one-way releasing valve means comprises a seal member mounted in a top portion of said releasing room, a second ball valve mounted in said releasing room, and a spring interposed between said seal member and said second ball valve for biasing said second ball valve downwardly to seal off communication between said releasing room and said outlet hole.

8. A valve as recited in claim 7, wherein
said releasing room has internal helical threads formed in an upper portion thereof; and said seal member comprises an adjusting screw having external helical threads, said adjusting screw defining a means for adjusting said second predetermined pressure which must be exceeded in the portion of said chamber below said inlet/outlet assembly body before said one-way releasing valve means will allow air to flow from the portion of said chamber below said inlet/outlet assembly body, and through said releasing room, said bypass hole, and said exhaust hole.

9. A valve as recited in claim 1, wherein
said inlet/outlet assembly body further has an outlet hole formed between said releasing room and the portion of said chamber below said inlet/outlet assembly body; and said one-way releasing valve means comprises a seal member mounted in a top portion of said releasing room, a second ball valve mounted in said releasing room, and a spring interposed between said seal member and said second ball valve for biasing said second ball valve downwardly to seal off communication between said releasing room and said outlet hole.

10. A valve as recited in claim 9, wherein
said releasing room has internal helical threads formed in an upper portion thereof; and said seal member comprises an adjusting screw having external helical threads, said adjusting screw defining a means for adjusting said second predetermined pressure which must be exceeded in the portion of said chamber below said inlet/outlet assembly body before said one-way releasing valve means will allow air to flow from the portion of said chamber below said inlet/outlet assembly body, and through said releasing room, said bypass hole, and said exhaust hole.

11. A valve as recited in claim 10, wherein
said releasing room defines a main releasing room;
said inlet/outlet assembly body further has formed therein an auxiliary releasing room, and an auxiliary outlet hole extending between a bottom end of said auxiliary releasing room and a lower portion of said main releasing room;

said bypass hole further communicates between an upper portion of said main releasing room and an upper portion of said auxiliary releasing room; and an auxiliary one-way releasing valve means is provided for allowing air to flow from said auxiliary outlet hole through said auxiliary releasing room into said bypass hole only when air pressure in said auxiliary outlet hole is greater than a third predetermined pressure.

12. A valve as recited in claim 11, wherein
said auxiliary one-way releasing valve means comprises an auxiliary seal member mounted in a top portion of said auxiliary releasing room, a third ball valve mounted in said auxiliary releasing room and a spring interposed between said auxiliary seal member and said third ball valve for biasing said third ball valve downwardly to seal off communication between said auxiliary releasing room and said auxiliary outlet hole.

13. A valve as recited in claim 12, wherein
said auxiliary releasing room has internal helical threads formed in an upper portion thereof; and said auxiliary seal member comprises an auxiliary adjusting screw having external helical threads, said auxiliary adjusting screw defining a means for adjusting said third predetermined pressure which must be exceeded in said auxiliary outlet hole before said auxiliary one-way releasing valve means will allow air to flow from said auxiliary outlet hole, and through said auxiliary releasing room, said bypass hole and said exhaust hole.

14. A valve as recited in claim 9, wherein
said releasing room defines a main releasing room;
said inlet/outlet assembly body further has formed therein an auxiliary releasing room, and an auxiliary outlet hole extending between a bottom end of said auxiliary releasing room and a lower portion of said main releasing room;

said bypass hole further communicates between an upper portion of said main releasing room and an upper portion of said auxiliary releasing room; and an auxiliary one-way releasing valve means is provided for allowing air to flow from said auxiliary outlet hole through said auxiliary releasing room into said bypass hole only when air pressure in said auxiliary outlet hole is greater than a third predetermined pressure.

15. A valve as recited in claim 14, wherein
said auxiliary one-way releasing valve means comprises an auxiliary seal member mounted in a top portion of said auxiliary releasing room, a third ball valve mounted in said auxiliary releasing room and a spring interposed between said auxiliary seal member and said third ball valve for biasing said third ball valve downwardly to seal off communication between said auxiliary releasing room and said auxiliary outlet hole.

16. A valve as recited in claim 15, wherein
said auxiliary releasing room has internal helical threads formed in an upper portion thereof; and
said auxiliary seal member comprises an auxiliary adjusting screw having external helical threads, said auxiliary adjusting screw defining a means for adjusting said third predetermined pressure which must be exceeded in said auxiliary outlet hole before said auxiliary one-way releasing valve means will allow air to flow from said auxiliary outlet hole, and through said auxiliary releasing room, said bypass hole and said exhaust hole.

17. A valve as recited in claim 14, further comprising
manual pressure release means for manually causing air to flow from below said inlet/outlet assembly body to outside of said valve body.

18. A valve as recited in claim 17, wherein
said manual pressure release means comprises a manual pressure release hole formed through said inlet assembly body, an actuating rod extending from above said inlet assembly body, through said manual pressure release hole, through said inlet hole, and attaching to said first ball valve, and a means for biasing said actuating rod upwardly.

19. A valve as recited in claim 1, further comprising
manual pressure release means for manually causing air to flow from below said inlet/outlet assembly body to outside of said valve body.

20. A valve as recited in claim 19, wherein
said manual pressure release means comprises a manual pressure release hole formed through said inlet assembly body, means for sealing said manual pressure release hole, and means for manually opening said manual pressure release hole and for manually overriding said one-way intake valve means to allow air to flow from the portion of said chamber below said inlet/outlet assembly body through said intake room to the portion of said chamber above said inlet/outlet assembly body.

* * * * *